United States Patent [19]

Snellman

[11] Patent Number: 4,747,195
[45] Date of Patent: May 31, 1988

[54] ROLL FOR USE IN A PAPER MACHINE

[75] Inventor: Jorma Snellman, Jyväskylä, Finland

[73] Assignee: Valmet Oy, Finland

[21] Appl. No.: 934,807

[22] Filed: Nov. 25, 1986

[30] Foreign Application Priority Data

Nov. 27, 1985 [FI] Finland ............................. 854693

[51] Int. Cl.⁴ .......................................... B21B 27/00
[52] U.S. Cl. ............................. 29/116 R; 29/113 R; 29/113 AD; 29/116 AD
[58] Field of Search ...... 29/116 AD, 116 R, 113 AD, 29/113 R, 110; 100/162 B, 170, 162 R; 162/280

[56] References Cited

U.S. PATENT DOCUMENTS

| | | | |
|---|---|---|---|
| 4,007,522 | 2/1977 | Hold et al. | 29/116 AD |
| 4,106,405 | 8/1978 | Biondetti et al. | 29/116 AD |
| 4,373,238 | 2/1983 | Guttinger | 29/113 AD |
| 4,404,724 | 9/1983 | Christ et al. | 29/116 AD |

FOREIGN PATENT DOCUMENTS 2646769 6/1977 Fed. Rep. of Germany ........ 29/116 AD
2657061 4/1978 Fed. Rep. of Germany ........ 29/116 AD Primary Examiner—P. W. Echols
Assistant Examiner—Irene Cuda
Attorney, Agent, or Firm—Steinberg & Raskin

[57] ABSTRACT

A roll, for use in the dewatering press of a paper machine or a calender roll, having adjustable zones. The roll has a non-revolving massive central axle, on which a substantially cylindrical roll mantle is journalled to rotate. Between the central axis and an inner face of the roll mantle, a loading piston-cylinder group or block arrangement is situated, having pistons which can be loaded by hydraulic fluid pressure against the inner face of the roll mantle so as to adjust distribution of pressure in zones along the roll. The loading piston-cylinder group or block arrangement comprises a substantially elongated or oblong cylinder group or block fitted into an axially-extending groove along the central axle, with the cylinder group or block being a separate component from the central axle itself. The cylinder group or block is supported only in the regions of the longitudinal ends thereof upon the central axle, by way of particular supporting arrangements.

22 Claims, 2 Drawing Sheets

ROLL FOR USE IN A PAPER MACHINE

BACKGROUND OF THE INVENTION

The present invention is directed to a roll having adjustable press zones, such as a roll used in the dewatering press of a paper machine or a calender roll. Such a roll comprises a non-revolving massive central axle, on which a cylindrical roll mantle is rotatably journalled, with a piston-cylinder group or block loading arrangement being fitted between the central axle and an inner face of the roll mantle. In such an arrangement, outer loading pistons can be loaded by means of pressure from hydraulic fluid against the inner face of the roll mantle, so as to adjust the distribution of pressure in zones of a nip formed with the roll on an opposite side of the mantle from the loading pistons, i.e. in a nip facing the loading pistons.

In paper machines, several such rolls are used to form a dewatering press nip, or a smoothing nip, or a calendering nip with a counter-roll. In these applications, it is important for distribution or profile of linear load in the nip to remain constant in the axial direction of the rolls, or for the pressure profile to be adjusted as desired, e.g., so as to control the moisture profile and/or the thickness profile of the web in the transverse direction. For this purpose, different adjustable-crown or variable-crown rolls have been known in the prior art, by means of which attempts are made to affect distribution of the linear load in a nip.

In the prior art, several different variable-crown or adjustable-crown rolls for paper machines are known. As a rule, these rolls comprise a massive, stationary roll axle and a roll mantle arranged to be rotatable about the axle. Between the axle and mantle, glide shoe arrangements and/or pressure fluid chambers acting upon the inner face of the mantle are fitted, and are divided into several parts over the axial direction of the roll, so that the axial profile of the mantle at the nip can be straightened or adjusted as desired. As a rule, nips formed by such rolls, such as press nips or calendering nips, are loaded by means of loading forces directed at the axle journals of the adjustable-crown roll and of its counter-roll. The present invention is related to such variable-crown rolls, including a series of glide shoes having glide faces which are hydrostatically lubricated by means of pressure fluid passed onto the glide face.

With respect to prior art technology, reference is made by way of example, to DE Pat. Nos. 2,838,427 and 3,022,491, to FI Pat. No. 59,655, and to FI Applications Nos. 2703/73 and 760117. From the supporting and loading members used in variable-crown rolls, acting upon the inner face of the roll mantle and loaded by means of pressure fluid, a great number of functions of different nature are required, the integration thereof in the same member not having been fully successful by means of the arrangements known in the prior art. A list of certain properties required of the supporting and loading members, is given as follows:

The hydrostatic lubrication of the support member, as well as of the loading piston/cylinder must be sufficiently well-sealed, even with varying loading forces and when an angular change occurs between the roll mantle and the inner part;

The loading pistons of the support members must receive lateral forces, which are friction forces;

The loading equipment of the support member must be capable of acting as an articulated joint, because the relative positions of the mantle to be supported and the central axle vary to a considerable extent as the loading forces vary;

The pistons of the support member must yield sufficient radial force, whose range of variation is relatively large in order to support and to load the mantle;

It must be possible to control the thickness of the oil film that lubricates the glide face of the support member; and The bore placed in connection with the pistons of the support member, and the pistons of the support member itself, must permit even considerable radial movements of the pistons.

In the prior art supporting and loading members, certain of the functions or characteristics listed above are not accomplished satisfactorily. Certainly, all of the functions listed above are not accomplished satisfactorily together. Thus, an object of the present invention is to avoid the drawbacks present in these prior art devices, and to provide a novel roll structure for the purposes concerned.

The prior-art glide shoes for variable-crown rolls, based on hydrodynamic lubrication, have involved, for example, the drawback that at a low speed, the lubrication is not sufficiently effective. It is partially due to this previously-encountered drawback that, in the present invention, efforts have been taken for further development of rolls which are adjustable in zones expressly based on hydrostatic glide shoes.

As follows from the above, a commonly used construction of a press roll adjustable in zones is such that the cylinders of the press pistons acting upon the inner face of the revolving mantle are stationary in relation to the massive central axle of the roll. Such cylinders, as a rule, consist of bores made into the central axle itself. This results in the drawback that when the central axle is deflected, the position and direction of the cylinders are also altered, which then affects the loading pistons of the cylinders in the form of changes in direction and position. These changes then deteriorate the mutual lubricated glide contact between the pistons and the revolving cylinder mantle.

In order to eliminate these problems, a great number of different sealing and articulation arrangements between the loading pistons and the cylinders thereof have been created. However, all of these have been characterized by complicated construction and operational deficiencies.

SUMMARY OF THE INVENTION

Accordingly, it is an object of the present invention to avoid the drawbacks noted above with respect to the prior art.

It is also an object of the present invention to act to solve the problems noted above by principles entirely different from those of prior-art rolls.

It is another object of the present invention to provide an adjustable-crown roll being adjustable over zones, which does not involve the drawbacks discussed above and which is simple in construction and simple and reliable in operation.

It is a further object of the present invention to provide an adjustable-crown roll having excellent sealing between the loading pistons and the cylinders thereof.

These and other objects are attained by the present invention which is directed to a roll for use in a paper machine, such as a calender roll or a dewatering press roll. The roll has a central axle fixed against rotation and having at least one axially-extending groove formed therein. A cylindrical roll mantle is rotatably mounted on the axle. An elongated cylinder block is separate from the central axle and is situated in the axially-extending groove. A plurality of cylinders are formed in the cylinder block.

A plurality of pressure-actuated pistons are each situated in the respective cylinders, and are adapted to be loaded against an inner surface of the mantle. Means are provided for supporting the elongated cylinder block (with the pistons situated in the cylinders thereof) on the central axle, only in the region of the ends of the elongated cylinder block.

With a view to attaining the goals and objects stated above, and others which will become more apparent below, the present invention is principally characterized by the loading piston/cylinder group or block arrangement having an oblong cylinder group or block fitted into an axial groove in the central axle, the cylinder group or block being a separate component from the central axle. The cylinder group or block is supported on the central axle substantially only at the proximity of both ends of the cylinder group or block, by means of particular supporting arrangements.

Since, in the invention, the cylinder groups or blocks are supported only at the ends thereof upon the central axle, e.g. by means of articulated joints, deflection of the central axle does not affect the cylinder groups or blocks. This is a reason why the loading pistons are always substantially perpendicular to the roll mantle in operating situations of the present invention. This is also the reason why the loading pistons do not have to be inclinable and no particular sealing and articulation arrangements are required between the pistons and the cylinder group or block itself in accordance with the present invention, such arrangements having been indispensable in the prior art constructions.

When a central axle and a cylinder group or block separate from one another are used in accordance with the present invention, then these parts can be manufactured out of different materials which are precisely suitable for the purpose of use of the particular component concerned. Moreover, the present invention makes it possible to modernize press rolls which are adjustable in zones that are already in operation. In other words, the present invention allows retaining the high-cost central axle and the roll mantle of the previous roll, while providing the roll with new cylinder groups or blocks and loading pistons.

BRIEF DESCRIPTION OF THE DRAWINGS

The invention will now be described in greater detail below with reference to embodiments illustrated in the accompanying drawings, which are merely exemplary and to which the present invention is not intended to be confined. In the drawings.

DESCRIPTION OF THE PREFERRED EMBODIMENTS

Figure 1:
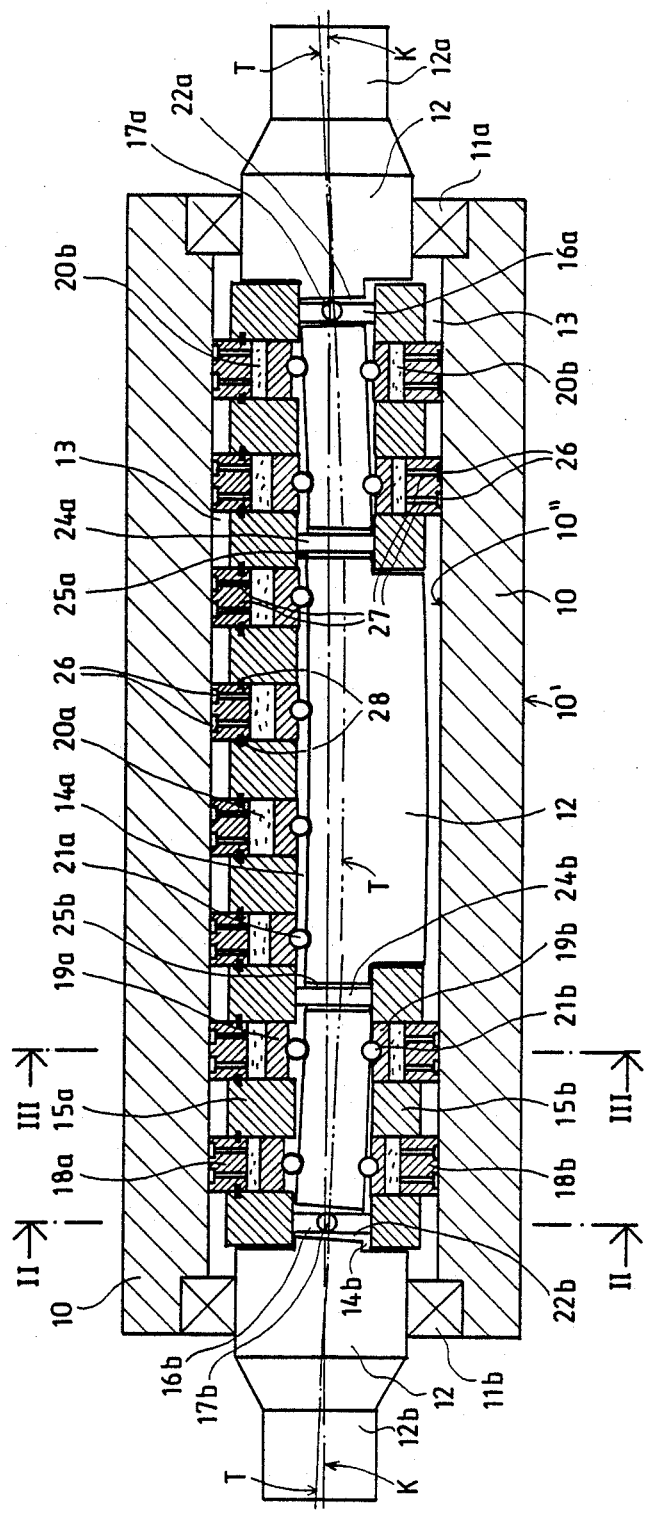
FIG. 1 illustrates an axial sectional view of a press roll adjustable in zones in accordance with the present invention.
Figure 2:
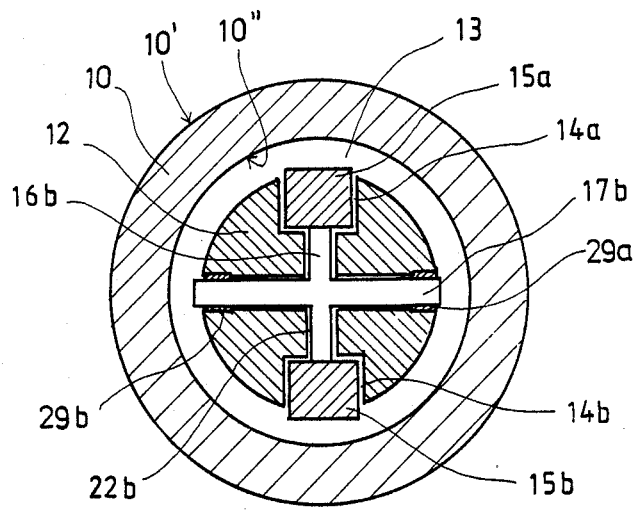
FIG. 2 is a cross-sectional view along line II—II in FIG. 1.
Figure 3:
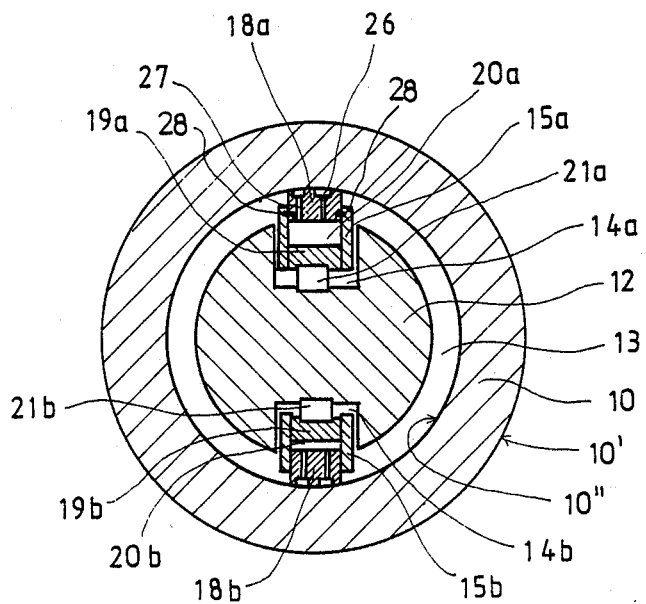
FIG. 3 is a cross-sectional view along line III—III in FIG. 1.

Referring to FIGS. 1–3, a roll such as a press roll which has adjustable zones, for example a roll in a dewatering press in a paper machine or a calender roll, comprises a revolving mantle 10 journalled on a stationary massive axle 12. The mantle 10 is provided with a smooth or grooved outer face 10' and with an inner face 10''. The mantle 10 is supported by means of bearings 11a and 11b to be rotatable on the axle 12. The roll is loaded against a counter-roll (not shown) by means of axle journals 12a and 12b, so as to form the compression pressure in a press or a calendering nip.

An intermediate space 13, sufficiently large in view of deflection, remains between the axle 12 and the inner face 10'' of the mantle 10. For the purpose of controlling the distribution of compression pressure in the nip, two opposite series of loading pistons 18a and 18b are arranged in connection with the central axle 12. These pistons are situated one after the other in a line over the axial direction of the roll. The arrangement and support of the loading pistons 18a and 18b, along with the cylinders 15a, 15b thereof on the central axle 12 are novel and substantially different from the prior art corresponding arrangements.

Longitudinal groove spaces 14a and 14b are formed on opposite sides of the central axle 12 and extend axially therealong, with oblong or elongated cylinder groups 15a and 15b being provided in the respective axially-extending grooves or spaces 14a and 14b. In the illustrated embodiment, groove 14a axially extends substantially over the entire axial length of the roll mantle 10 while group 14b extends over only a portion thereof. For example, in the illustrated embodiment two separate axially-extending grooves are provided opposite longitudinal groove 14a, and extend partially along the axle 12 from opposite ends thereof. The exact number and length of such axially-extending grooves may be conveniently varied in accordance with the present invention.

As illustrated in FIGS. 1 and 3, the cylinder groups 15a and 15b are provided with uniformly-spaced cylinder bores 20a and 20b, in which the respective loading pistons 18a and 18b are fitted with pressure-proof sealing. The opposite cylinder groups or blocks 15a and 15b, if such opposing cylinder blocks are utilized, are supported at both of the ends thereof against one another, by means of arms 16a, 16b and 24a, 24b.

More particularly, these arms 16a, 16b and 24a, 24b extend through respective radial bores 22a, 22b and 25a, 25b in the central axle 12, with sufficiently large play. The outer arms 16a and 16b are attached at the middle or midpoint thereof, to transverse arms 17a and 17b, which are supported by means of bearings 29a and 29b on the central axle 12 (FIG. 2). By interposition of the cross-arms 16a, 17a and 16b, 17b formed in this manner, the cylinder groups or blocks 15a and 15b are supported and attached at both ends thereof, in connection with the central axle 12. The intermediate arms 24a and 24b are not attached to the central axle 12.

In addition to the loading pistons 18a and 18b, counter-pistons 19a and 19b are also situated in the respective cylinder bores 20a and 20b, with these counter-pistons 19a and 19b being supported by the interposition of substantially cylindrical articulation pieces 21a and 21b on the central axle 12. As illustrated in FIGS. 1 and 3, these substantially cylindrical articulation pieces 21a and 21b are situated at the bottom, i.e. the inner radial edges of the respective grooves 14a and 14b. Furthermore, as clearly illustrated, the substantially cylindrical articulation pieces are situated upon the axle 12, such that the respective axes of the articulation pieces 21a and 21b extend substantially perpendicularly to the axis of the central axle 12.

In the manner described above, a structure is provided in which the oblong or elongated cylinder groups or blocks 15a and 15b, are situated totally independently from any deflection of the central axle 12. In FIG. 1, the center line of the deflected central axle 12 is denoted by the twin-point broken line T—T, while the center line of an undeflected central axle 12 is denoted by the dash-dot line K—K.

Pressure fluid is passed into the cylinder spaces between the pistons 18a, 19a and counter-pistons 18b, 19b, in a manner known in the prior art, so as to press the loading pistons 18a and 18b against the inner face 10″ of the mantle 10. Duct means, i.e. lubrication ducts 27 pass through the loading pistons 18a and 18b, and open into lubrication chambers 26 in the glide faces of the pistons, so that the fluid entering into the chambers 26 lubricates the pressure-loaded glide face between the loading pistons 18a, 18b and the inner face 10″ hydrostatically.

Hydraulic fluid is passed into the pressure spaces between the pistons 18a, 19a and 18b, 19b either through the articulated joints 21a, 21b or through bores (not shown) provided in the cylinder groups or blocks 14a and 15b themselves. Apparatus are provided by means of which the pressure of the fluid passed into each pressure space in the respective cylinder groups or blocks 15a and 15b can be adjusted separately so as to adjust the profile of the roll mantle 10. This apparatus, known in and of itself, is not illustrated in the figures.

The movement of the loading pistons 18a and 18b outwardly from the central axle 12, is limited by retaining rings 28 so that the cylinder groups 15a and 15b, being quite flexible elongated or oblong pieces made of at least slightly flexible material, can be made to follow the deflection of the mantle 10 to some extent and, so that even in exceptional situations of operation, compression pressure sufficient in view of fluid leakage and lubrication can be obtained between the loading pistons 18a and 18b, and the inner face 10″ of the mantle 10. Thus the rings 28 constitute means for forcing the relatively flexible cylinder groups or blocks 15a, 15b to follow the pressure-actuated pistons 18a, 18b to a certain extent, when the same follow deflection of the roll mantle 10 in the radial direction.

It is possible to use all prior-art arrangements that have been noted to be good in connection with the arrangements used in the hydrostatic lubrication of the loading pistons 18a and 18b, in which respect only the fluid ducts 27 and the lubrication chambers 26 in the glide faces have been schematically illustrated in the figures and described above. The loading pistons 18a and 18b, and the counter-pistons 19a and 19b thereof, are preferably circular and cross-section, as are the corresponding cylinder bores 20a and 20b. However, in particular cases it is also possible to use other pistoncylinder sectional forms, even though from the point of view of manufacturing technology and sealing, circular cross-sections are usually most advantageous. Accordingly, the term "cylinder" as used herein is not intended to limit the particular shape of the respective cylinders or bores in which the pistons are fitted.

The axially-extending grooves 14a and 14b are made as narrow and as shallow as possible, so that the grooves 14a and 14b will reduce strength of the central axle 12, subjected to high bending loads, as little as possible. Minimal cross-sectional area of the grooves 14a and 14b is partially achieved by means of suitable spacing of the loading pistons 18a and 18b, such spacing preferably being as close as possible.

An embodiment of the present invention is illustrated in FIGS. 1 and 3 in which the respective cylinders in each cylinder group or block 15a and 15b are in a single line, which is substantially parallel to the longitudinal axis of the roll, and with the individual cylinders preferably being substantially equally spaced from one another. Other locations of the cylinders in the cylinder group or block may also be used. For example, two or more cylinder lines in a single block may be formed side by side. In these particular lines or rows, the cylinders may be situated in the groups thereof to interlock with one another so that a maximum proportion of the areas of the cylinder groups are occupied by the cylinders themselves, and with the cylinder groups or blocks also becoming flexible therefore.

FIGS. 1–3 illustrate two opposite grooves 14a and 14b formed in the central axle 12 of the roll, each of the grooves having a cylinder group 15a and 15b. The present invention may naturally be practiced such that the central axle 12 has only one groove, in which there is only one cylinder group. In such a case, those components by means of which the opposite cylinder groups 15a and 15b are interconnected, are naturally omitted. Moreover, the scope of the present invention also includes such applications in which one cylinder group, e.g. 15a, is of "full length", i.e. extends substantially along the entire axial length of the roll, while the other cylinder group or block 15b is shorter. For example, as illustrated in FIG. 1, this other cylinder group or block 15b may be formed of two shorter parts, such shorter parts being situated proximate to both axial ends of the mantle 10. It is naturally possible to use more than two jointly operative cylinder groups and series of pistons 18a, 19a, 18b, 19b fitted therein.

The preceding description of the present invention is merely exemplary, and is not intended to limit the scope thereof in any way.

What is claimed is:

1. A roll for use in a paper machine, such as a calender roll or a dewatering press roll, comprising:
   a central axle fixed against rotation, having at least one axially extending groove formed therein;
   a cylindrical roll mantle rotatably mounted on said axle;
   an elongated cylinder block separate from said central axle and situated in said axially-extending groove, said cylinder block having a plurality of cylinders formed therein;
   a plurality of pressure-actuated pistons situated in respective cylinders and adapted to be loaded against an inner surface of said mantle; and
   means for supporting said elongated cylinder block with said pistons situated in said cylinders thereof on said central axle only in the regions of the ends of said elongated cylinder block;
   wherein each of said cylinders comprises a bore extending in a substantially radial direction of said roll, with each said pressure-actuated piston being situated in a respective bore and constituting an outer piston situated therein; and additionally comprising a plurality of inner pistons, each said inner piston situated in a respective bore between said outer piston and said axle, and defining a space for fluid between said respective inner and outer pistons;

said pistons and cylinder block forming a glide shoe arrangement loading the inner surface of said mantle.

2. The roll of claim 1, additionally comprising means for supporting each said inner piston upon said inner axle.

3. The roll of claim 1, wherein each said piston remains substantially perpendicular to said roll mantle when loaded against the same.

4. The roll of claim 1, wherein said cylinders are arranged in at least two lines on said cylinder block.

5. The roll of claim 1, wherein said cylinder block is made of at least slightly flexible material, and additionally comprising means for forcing said cylinder block to follow said pressure-actuated pistons to a certain extent, when the same follow deflection of said mantle in a radial direction.

6. The roll of claim 1, wherein said cylinder block extends over substantially the entire axial length of said roll.

7. The roll of claim 1, additionally comprising
two axially-extending grooves in said axle, and
two cylinder blocks, each situated in a respective axially-extending groove,
a first one of said grooves extending over substantially the entire axial length of said roll; and
a second one of said grooves extending over at least a part of the entire axial length of said roll.

8. The roll of claim 7, additionally comprising a third axially-extending groove in said axle, and a third cylinder block situated in said third groove, wherein
said second and third axially-extending grooves extend over a part of the axial length of said roll, and from opposite ends thereof.

9. The roll of claim 1, wherein said cylinders are arranged in a single line upon said cylinder block.

10. The roll of claim 9, wherein said cylinders are substantially equally spaced from one another.

11. A roll for use in a paper machine, such as a calender roll or a dewatering press roll, comprising:
a central axle fixed against rotation, having at least one axially extending groove formed therein;
a cylindrical roll mantle rotatably mounted on said axle;
an elongated cylinder block separate from said central axle and situated in said axially-extending groove, said cylinder block having a plurality of cylinders formed therein;
a plurality of pressure-acutated pistons situated in respective cylinders and adapted to be loaded against an inner surface of said mantle; and
means for supporting said elongated cylinder block with said pistons situated in said cylinders thereof on said central axle only in the regions of the ends of said elongated cylinder block;
wherein each of said cylinders comprises a bore extending in a substantially radial direction of said roll, with each said pressure-acutated piston being situated in a respective bore and constituting an outer piston situated therein; and additionally comprising a plurality of inner pistons, each said inner piston situated in a respective bore between said outer piston and said axle, and defining a space for fluid between said respective inner and outer pistons;

said pistons and cylinder block forming a glide shoe arrangement loading the inner surface of said mantle; and each said outer piston comprising duct means passing therethrough and communicating with said respective fluid space, such that the fluid is adapted to flow through said duct means in said outer piston from said fluid space and lubricate said glide shoe arrangement.

12. The roll of claim 11, additionally comprising
a plurality of articulation members, each said articulation member supporting a respective inner piston upon said axle.

13. The roll of claim 12, wherein said articulation members are situated in said axially-extending groove, and are supported upon said axle at an inner radial edge of said axially-extending groove.

14. The roll of claim 12, wherein
said articulation members are each substantially cylindrical in shape and are situated upon said axle such that a longitudinal axis of each articulation member extends substantially perpendicularly to said axle.

15. The roll of claim 11, wherein said duct means comprise
a plurality of ducts extending through said piston, and
a plurality of lubrication chambers, said ducts opening into said lubrication chambers, and said lubrication chambers opening to a surface of said outer piston facing the inner surface of said mantle to provide hydrostatic lubrication of said glide-shoe arrangement, and
additionally comprising means for feeding the fluid to said fluid space through said articulation members or through said cylinder block.

16. A roll for use in a paper machine, such as a calender roll or a dewatering roll, comprising:
a central axle fixed against rotation, having two axially-extending grooves formed therein;
a first one of said grooves extending over substantially the entire axial length of said roll; and
a second one of said grooves extending over at least a part of the entire axial length of said roll;
a cylindrical roll mantle rotatably mounted on said axle;
two elongated cylinder blocks separate from said central axle and each situated in a respective axially-extending groove, said cylinder blocks each having a plurality of cylinders formed therein;
a plurality of pressure-actuated pistons situated in respective cylinders and adapted to be loaded against an inner surface of said mantle; and
means for supporting said elongated cylinder blocks with said pistons situated in said cylinders thereof on said central axle only in the regions of the ends of said elongated cylinder blocks;
wherein said supporting means comprise
at least one bore extending substantially radially through said axle in the region of an end of said roll;
a rod extending through said radial bore of said axle and interconnecting said two cylinder blocks; and
a pair of arms extending substantially transverely from said rod and being supported upon said axle.

17. The roll of claim 16, wherein said supporting means additionally comprise
a pair of bearings mounted upon said axle, with said transversely-extending arms being mounted upon said axle at ends away from said rod, through said pair of bearings.

18. The roll of claim 17, wherein said transversely-extending arms are connected to said rod substantially at a midpoint thereof.

19. The roll of claim 16, wherein said supporting means additionally comprise
a second bore extending substantially radially through said axle; and
a second rod extending through said second bore and interconnecting said two cylinder blocks.

20. The roll of claim 19, wherein said second rod is not mounted upon said axle.

21. A roll for use in a paper machine, such as a calender roll or a dewatering press roll, comprising:
a central axle fixed against rotation, having at least one axially extending groove formed therein;
a cylindrical roll mantle rotatably mounted on said axle;
an elongated cylinder block separate from said central axle and situated in said axially-extending groove, said cylinder block having a plurality of cylinders formed therein;
a plurality of pressure-actuated pistons situated in respective cylinders and adapted to be loaded against an inner surface of said mantle; and
means for supporting said elongated cylinder block with said pistons situated in said cylinders thereof on said central axle only in the regions of the ends of said elongated cylinder block;
wherein said cylinder block is made of at least slightly flexible material, and additionally comprising
means for forcing said cylinder block to follow said pressure-actuated pistons to a certain extent, when the same follow deflection of said mantle in a radial direction;
wherein said forcing means comprise a retaining ring situated in each cylinder for limiting outward radial movement of said piston with respect to said cylinder block.

22. A roll for use in a paper machine, such as a calender roll or a dewatering press roll, comprising:
a central axle fixed against rotation, having three axially-extending grooves formed therein;
a first one of said grooves extending over substantially the entire axial length of said roll; and
a second one and a third one of said grooves extending over a part of the axial length of said roll, and from opposite ends thereof;
a cylindrical roll mantle rotatably mounted on said axle;
three elongated cylinder blocks separate from said central axle and each situated in a respective axially-extending groove, said cylinder blocks each having a plurality of cylinders formed therein;
a plurality of pressure-actuated pistons situated in respective cylinders and adapted to be loaded against an inner surface of said mantle; and
means for supporting said elongated cylinder blocks with said pistons situated in said cylinders thereof on said central axle only in the regions of the ends of said elongated cylinder blocks;
wherein said supporting means comprise
a first pair of bores, each said bore extending substantially radially through said axle in an end region of said roll;
a first pair of rods, each said rod extending through a respective bore and being supportably mounted upon said axle and interconnecting said cylinder block in said first axially-extending groove with one of said cylinder blocks in said second or third axially-extending grooves;
a second pair of bores extending substantially radially through said axle and being spaced axially inwardly from said first pair of bores; and
a second pair or rods, each rod of said second pair extending through a respective bore of said second pair, and interconnecting said cylinder block in said first axially-extending groove with one of said cylinder blocks in said second or third-axially-extending grooves;
said second pair or rods not being mounted upon said axle.

* * * * *